United States Patent [19]

Graham

[11] Patent Number: 4,863,115
[45] Date of Patent: Sep. 5, 1989

[54] TAPE TEST CASSETTE

[76] Inventor: Wayne B. Graham, 11630 Jessica Ln., Los Altos Hills, Calif. 94022

[21] Appl. No.: 176,890

[22] Filed: Apr. 4, 1988

[51] Int. Cl.$^4$ .......................................... G11B 23/087
[52] U.S. Cl. .................................. 242/199; 242/71.8; 73/865.6; 360/132; 360/137
[58] Field of Search .............. 242/197–200, 242/77, 71.8, 118, 118.4, 68.5; 360/132, 137; 73/865.6

[56] References Cited

U.S. PATENT DOCUMENTS 2,508,651  5/1950  Pratt et al. .................... 242/71.8 X
3,677,496  7/1972  Apitz ................................... 242/199

FOREIGN PATENT DOCUMENTS 2821953  11/1978  Fed. Rep. of Germany ..... 242/71.8

Primary Examiner—David Werner
Attorney, Agent, or Firm—Joseph H. Smith

[57] ABSTRACT

A test cassette is provided for testing tape tensioning devices in tape recorders and players. The test cassette has a at least one of a supply reel and a takeup reel which has two circular arc portions of different radius. In a preferred embodiment, one of the circular arc portions has the radius of a substantially full reel of tape, and the other has the radius of a substantially empty reel of tape. In operation the test cassette simulates the conditions of a full reel and the conditions of a substantially empty reel with each revolution of the reel, and the extremes of operation of a tape tensioning device can be quickly and easily tested.

7 Claims, 6 Drawing Sheets

ANGULAR TRANSLATION OF SUPPLY REEL

ANGULAR TRANSLATION OF SUPPLY REEL

Fig. 5

ANGULAR TRANSLATION OF SUPPLY REEL

TAPE TEST CASSETTE

BACKGROUND OF THE INVENTION

The present invention is in the area of tape cassettes for video and audio tape players and recorders, and pertains more specifically to spools used in said cassettes which are specifically designed to perform or aid in the performance of testing functions in the manufacture or service of such tape players and recorders.

In this specification the term tape recorders will be used to mean playing and recording machines for all kinds of recording type, regardless whether such a machine is limited to playing or recording, or whether it may do both.

In many kinds of tape recorders it is common for the tape to be supplied to the recorder in a cassette, the cassette having a supply reel and a take-up reel. In loading, the cassette is supplied to the tape recorder, and the recorder typically has a mechanism for accepting the cassette and positioning it relative to the drive mechanisms and the playing or the recording head. In operation, whether recording or playing, the take-up reel is typically driven and tape is supplied at a constant rate from the supply reel. Due to the thin and typically fragile nature of the recording tape, it is typical for tape recorders to have a tape tensioning mechanism to maintain a relatively consistent or constant tape tension during transition from a fully supply reel to an empty supply reel.

In operation, while recording or playing, the take-up reel is typically driven, pulling the tape exiting from the capstan as it is pulled from the supply reel. A tape tensioning mechanism typically acts by supplying a torque to the supply reel opposite the direction of rotation of the supply reel.

Figure 1:
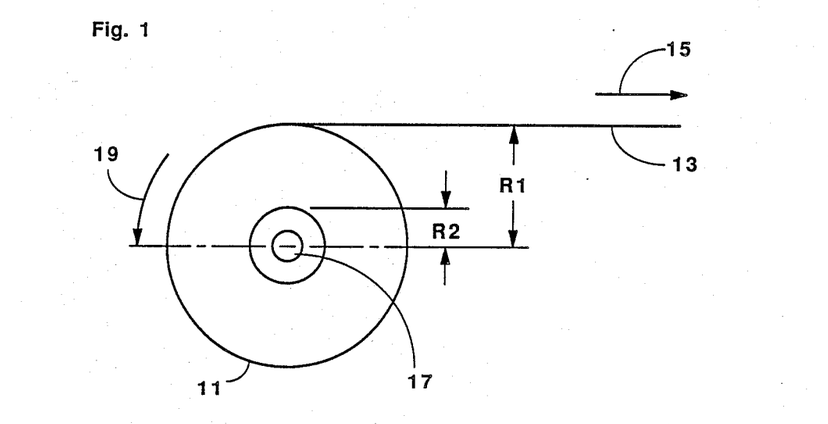
FIG. 1 is a plan view of a reel of a cassette showing the radii of a full and an empty reel.

FIG. 1 shows a reel 11 acting as the supply reel of a cassette and tape 13 wound on the reel with the tape being pulled off the reel in the direction of arrow 15. A torque of magnitude Q is applied by a tensioning mechanism to shaft 17, and the resulting torque is in the rotary direction of arrow 19.

Assuming a tape of relatively constant width and thickness, the tension T in the tape can be represented by the total pull force on the tape in the direction of arrow 15. In this case the tension will be represented by force terms, such as grams, rather than by force per unit area. If the tensioning mechanism maintains a constant torque Q on shaft 17, then the torque will be substantially balanced by the tension T multiplied by the radius R1. That is: $T \times R1 = Q$. As an example, under these circumstances, if the torque Q applied to shaft 17 is 90 gram-cm. and the radius R1 is 3.0 cm., the tape tension T, as a force, will be 30 grams.

If the radius R1 is the radius of the reel and tape in the full condition, before playing or recording begins, the radius will gradually change during operation until substantially the end of the tape is reached, and the radius at that time will be the radius of an empty supply reel, R2. Assuming R2=1.0 cm., if the torque Q does not change, and is maintained through operation at essentially 90 gram-cm., as in the first example, the tape tension T (force) will be, when the reel is substantially empty, T=90 grams. This is three times the value at the beginning of operation. For this reason it is common for tape tensioning mechanisms to be servo-driven to vary the torque on the supply reel to keep the tape tension substantially constant.

It is important in quality control to be able to test the performance of tape tensioning mechanisms in tape recorders quickly and easily during manufacture and in service and maintenance procedures. To properly test the operation of a tape tensioning mechanism, readings must be taken both with a fully supply reel and with a substantially empty supply reel, and the readings should be taken at a tape speed substantially the same as the normal tape speed in operation. To do so presently is time consuming, because after a tension measurement is made with a full reel, nearly all the tape must be unwound from the reel to make a tension measurement with the reel nearly empty.

The present invention provides a cassette and a method for making the two necessary measurements at the two extremes of operation quickly and easily.

SUMMARY OF THE INVENTION

A test spool is provided for testing tape tensioning devices in tape recorders and players that have tape tensioning devices for maintaining substantially constant tape tension. In accordance with the preferred embodiments of the invention, the spool is part of a test cassette that has a supply reel, or a takeup reel, or both the takeup and supply reels, which have the test spool with two circular arc portions of different radius. In the preferred mode, one of the circular arc portions has the radius of a substantially full reel of tape, and the other has the radius of a substantially empty reel of tape. In operation the test cassette simulates the conditions of a full reel and the conditions of a substantially empty reel with each revolution of the reel, and the extremes of operation of the tape tensioning device can be quickly and easily tested.

DESCRIPTION OF THE PREFERRED EMBODIMENTS

Figure 2A:
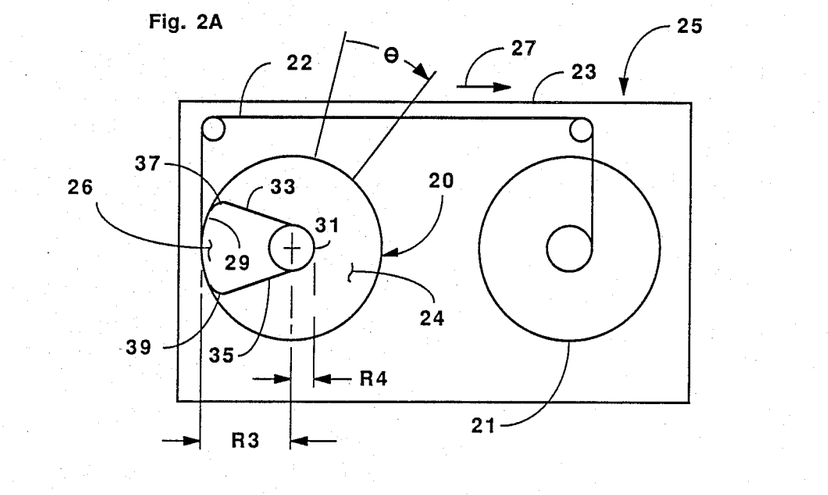
FIG. 2A is a cutaway plan view of a test cassette according to a preferred embodiment of the invention.
Figure 2B:
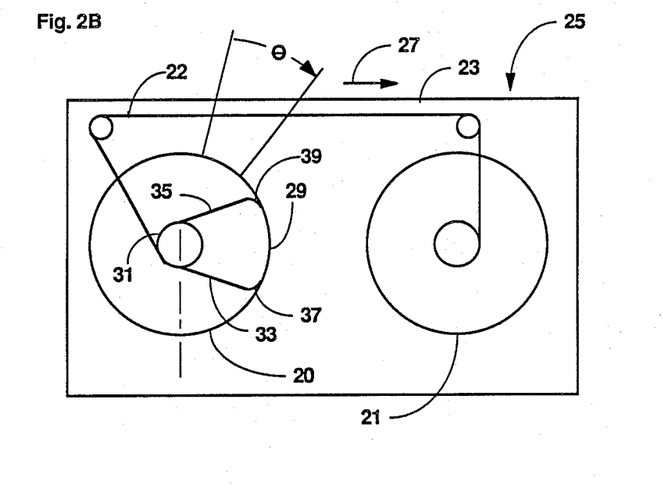
FIG. 2B is the plan view of FIG. 2A with the supply reel rotated 180 degrees.

FIG. 2A is a plan view of a test cassette 25 according to a preferred embodiment of the invention, with a portion of the housing 23 cut away to show the two reels inside the cassette. Supply reel 20 and take-up reel 21 are mounted in housing 23 according to common designs that are well known in the art, so that when cassette 25 is loaded to a tape recorder, engagement will be made with drive mechanisms of the recorder that can turn the reels. FIG. 2B shows the cassette of FIG. 2A with the supply reel rotated by one-half revolution, or 180 degrees. Tape 22 is shown extending from reel 20 to reel 21.

There are a number of different kinds of cassettes, such as those designed to work with video cassette recorders and players, those designed to work with audio cassette recorders and players, and cassettes designed for analog and digital data storage. The present invention is useful with cassettes of all kinds, as long as a tape recorder for which a cassette is used utilizes a servo mechanism or other device for maintaining a substantially consistent tape tension during operation.

In the cassette illustrated in FIGS. 2A and 2B, reel 20 is specially designed as a test reel. Reel 21 is a reel typical of a commercial cassette. In cassettes that must be placed in a tape recorder with the same side up, such as video cassettes, the specially designed reel is, in one preferred embodiment, the reel that would normally serve as the supply reel during recording or playing. In the case of cassettes that can be put into a tape recorder either side up, such as many audio tape recorders, the specially designed reel can be either reel, because the cassette can be placed in the tape recorder so that the specially designed reel is the supply reel in operation.

Figure 2C:
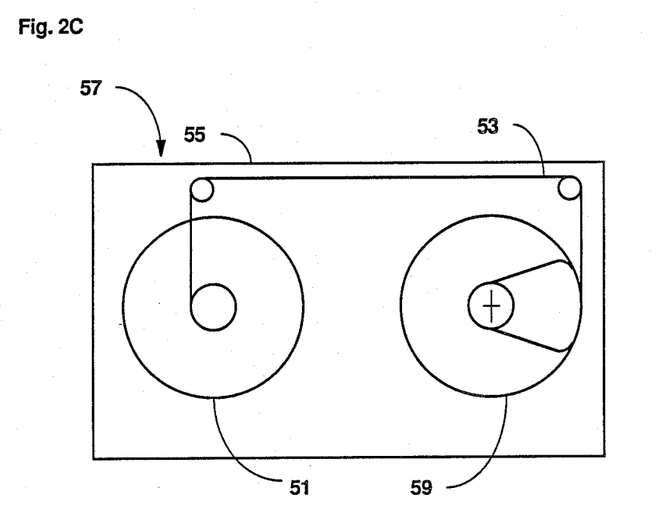
FIG. 2C is a plan view of a cassette according to the invention which has the takeup reel with two different radii.
Figure 2D:
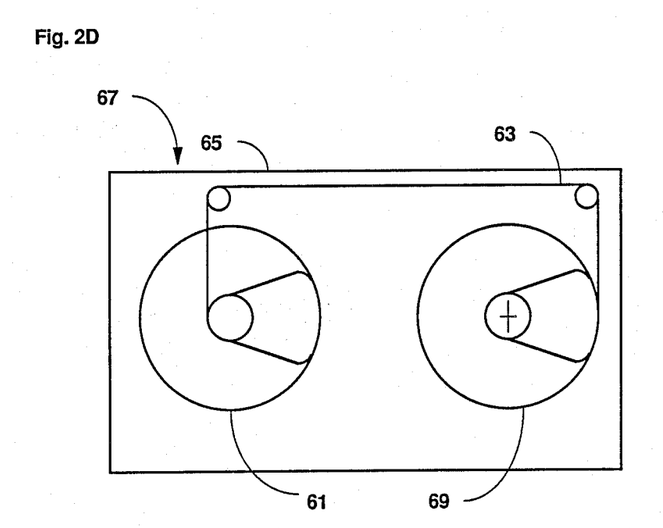
FIG. 2D is a plan view of a cassette according to the invention which has both the takeup reel and the supply reel each with two different radii.

Those skilled in the art will appreciate that, in some situations, it may be desired to maintain constant tension on the takeup side. A test cassette 57 used for testing in that situation is illustrated in FIG. 2C. There, the test cassette includes a standard housing 55, a standard supply reel 51, a tape 53, and a specially designed takeup reel 59. FIG. 2D shows a test cassette 67 that is used with a recording system which requires a constant tension on the tape on both the supply side and on the takeup side. In that situation, both the supply reel 61 and the takeup reel 69 may be of the special design. In a manner similar to the previous embodiments, the test cassette includes a tape 63 attached to the reels and a housing 65.

In the illustrative preferred embodiment of FIG. 2A, reel 20, which acts as the supply reel in operation, includes two flanges, represented by flange 24, which are attached to and spaced apart by an inner spool 26. Inner spool 26 includes two circular arcs 29 and 31 of different radii, positioned opposite each other relative to a common center located at the center of the supply reel, and two portions 33 and 35 connecting the circular arcs. This is quite unlike a typical cassette reel which has a spool with a single constant radius. As indicated, the radius R3 of arc 29 is different than the radius R4 of arc 31, and in the preferred mode R3 is the radius of a full reel of tape, and the radius R4 is the radius of an empty reel.

As indicated earlier, a test cassette with a specially designed reel as taught by this invention is useful in testing tape recorders of all kinds to determine the performance of the tape tensioning devices of such tape recorders. When a test cassette such as that shown in FIG. 2A is inserted into a tape recorder and started, the test cassette will cause the recorder to simulate the condition of a fully supply reel and of an empty supply reel, the two extremes of operation for a tape tensioning device, immediately during each revolution of the supply reel.

Hence, a tape tension measuring instrument such as a Tentel model TENTELOMETER® tape tension meter can be used to measure tension exerted on the tape when the supply reel is in the position of FIG. 2A, as though for a full reel of tape, and can be used to measure tension exerted on the tape when the supply reel is in the position of FIG. 2B, during the same single rotation of the supply reel, as though for a nearly empty reel of tape. The ability to measure the performance of a tape tensioning device at both extremes of operation during each revolution of the supply reel, rather than having to unwind tape nearly completely from a supply reel to simulate the two extremes, saves a large amount of time in a testing operation. The operation is similar with embodiments illustrated in FIGS. 2C and 2D.

In the preferred embodiment shown in FIG. 2A and FIG. 2B, the linear length of arcuate portion 29 at radius R3 is preferably the same as the linear length of arcuate portion 31 at radius R4. In the embodiments illustrated in FIGS. 2C and 2D, the preferred construction of the special reels is the same. With the tape traveling at a constant velocity during a test operation, the equal linear lengths of the arcuate portions will provide for an equal dwell time at each of the two operating extremes for the tape tensioning system. Angle $\theta$ in FIG. 2A and FIG. 2B represents an arbitrary angular displacement in the usual direction of operation during recording or playback. Small arcs 37 and 39 are arcuate portions of the reel connecting arcuate portion 29 with each of straight portions 33 and 35. The straight portions are each tangent to arcuate portion 31. Arrow 27 is in the direction of tape travel during normal recording and playback.

As indicated earlier, the function of a tape tensioning device in a tape recorder is to maintain a substantially consistent or constant tape tension during operation, all the way from a full supply reel to an empty supply reel. If T1 is the tape tension at the beginning of operation of a tape recorder, with a full supply reel, T2 is the tape tension at the other extreme of operation, when the supply reel is almost empty, R2 is the radius of the reel and tape of the supply reel when almost empty, R1 is the radius of the reel and tape of the supply reel when almost full, and the tape tensioning device is inoperative, then the tape tensions at the two extremes will differ substantially according to the formula: $T2 = T1 \times R1/R2$. With a tape tensioning device operating perfectly, the tape tension at the two extremes will be substantially the same:

$T1 = T2$.

Figure 3:
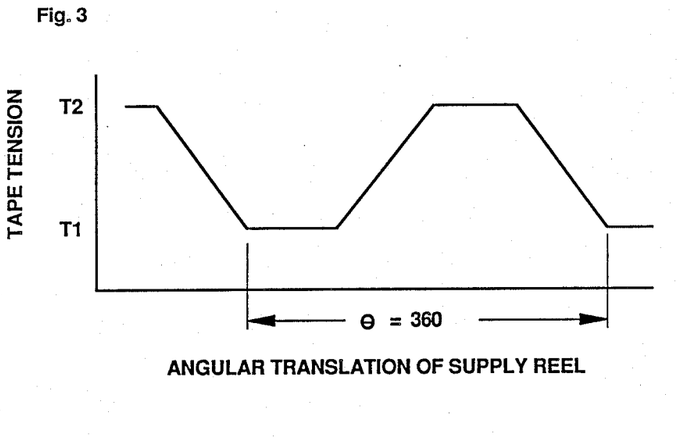
FIG. 3 is a plot of tape tension for a tape recorder with an inoperative tape tensioning device.

In a tape tension test using a test cassette according to the preferred embodiment, if the tape tensioning device is inoperative, a record of the tape tension against angular rotation of the supply reel will be much like the graph of FIG. 3. In FIG. 3, T2 is the tape tension with the gape from the supply reel at the radius corresponding to an almost empty supply reel, ie. R4 in FIG. 2A, and T1 is the tape tension with the tape from the supply reel at the radius corresponding to a full or nearly full supply reel, ie. R3 in FIG. 2A.

Figure 4:
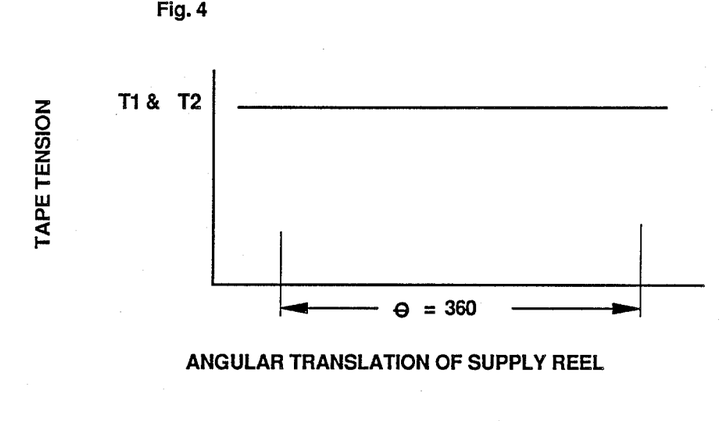
FIG. 4 is a plot of tape tension for a tape recorder with a perfectly operating tape tensioning device.

In a test of a tape recorder in which the tape tensioning device is operating perfectly, the graph would look like FIG. 4, with no change in tape tension as the test cassette supply reel revolves. In a test in which the tape tensioning device is partially operable the graph of tape tension would be like FIG. 5, with the extremes of tape tension closer than with an inoperative tape tensioning device as in FIG. 3.

Figure 5:
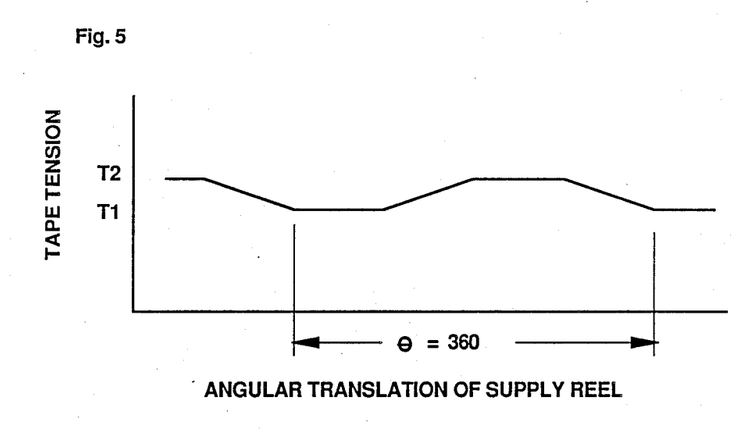
FIG. 5 is a plot of tape tension for a tape recorder with a partially operating tape tensioning device.

With a partially operative tape tensioning device the device could be either overcompensating or not compensating enough for the change in overall radius of the supply reel and tape as the tape is used. If T2 is the higher value, as shown in FIG. 5, then the device is not compensating enough. If T1 is the higher value, then the tape tensioning device is overcompensating for the change in overall radius of the supply reel and tape as tape is used. The relative degree to which the tape tensioning device is operative may be characterized by the absolute value of the difference in the high and low values of tape tension divided by T1: $\{abs(T2-T1)\}/T1$. It may be found in testing that this value is within an acceptable limit for a particular recorder and quality of tape used, and judgements can quickly and easily be made.

Figure 6:
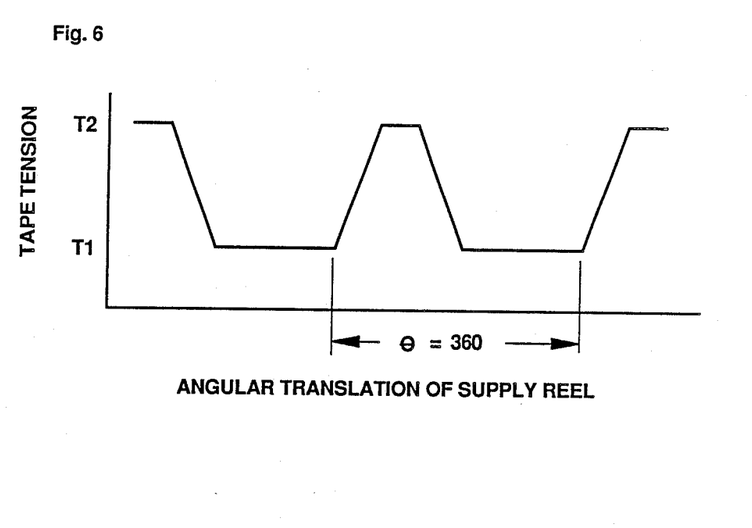
FIG. 6 is a plot of tape tension using a test cassette with unequal arc lengths.
Figure 7:
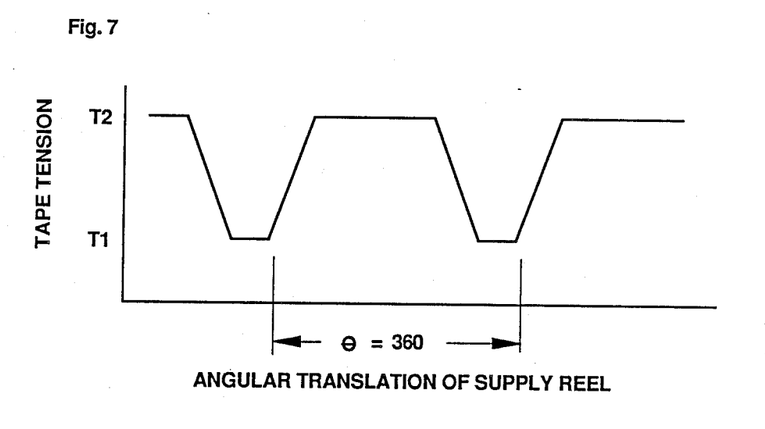
FIG. 7 is another plot of tape tension using a test cassette with unequal arc lengths.

In the preferred embodiment the linear lengths of arcuate potions 29 and 31 are equal, so the tension traces for T1 and T2 in a test, such as shown in FIGS. 3 and 5, will be of equal length, with the tape supplied at a constant rate, and will take an equal time to generate. It will be appreciated by those skilled in the art that it is is not required that the arc lengths representing the full and the substantially empty reel be equal. In an alternative embodiment in which the length of portion 29 is substantially longer than the length of portion 31 a test trace would appear more as shown by FIG. 6. If the length of portion 31 is longer than the length of portion 29 the test trace would appear more as shown by FIG. 7. In both FIGS. 6 and 7 it is assumed that the tape tensioning device is malfunctioning enough that the traces for T1 and T2 are substantially different in magnitude.

Figure 8:
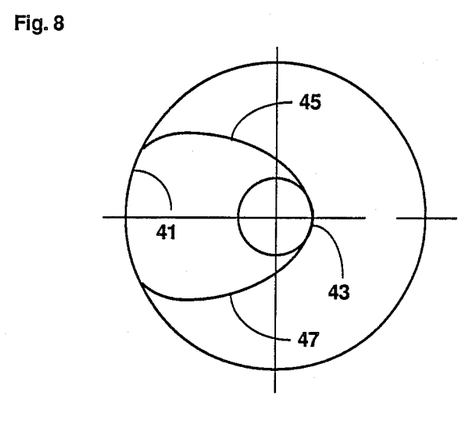
FIG. 8 is a plan view of a supply reel for a test cassette according to a preferred embodiment with the two circular arcs joined by arcuate portions.

In the preferred embodiment, portions 33 and 35 are straight, and small arcuate portions 37 and 39 blend the larger arcuate portion 29 with the straight portions. FIG. 8 shows an alternative embodiment in which arcuate portion 41 simulates a fully supply reel and arcuate portion 43 simulates a substantially empty supply reel. Portions 45 and 47 are compound curves smoothly joining portions 41 and 43. This design eliminates the sharp transitions which occur with the system having straight portions joining the two arcuate portions, thus avoiding potential overshoot problems which can occur with the tape tensioner.

It will be apparent to those skilled in the art that there are many alterations that may be made without departing from the spirit and scope of the invention. Portions of a reel may have arcuate portions simulating a substantially full and a substantially empty reel, and the lengths of the portions may be equal or unequal, for example. Further, the portions may be equal or unequal, for example. Further, the portions joining the arcs that simulate differing conditions for a reel according to the invention may be straight or curved, and if curved, the curvatures may encompass a broad variety of simple or compound curvatures. It will also be appreciated by those skilled in the art, that some cassettes may have reels with only one flange, or no flanges at all. Also, some recording systems may not use a cassette at all, eg. reel-to-reel type systems. In those systems, as for the exemplary embodiments, the shape of the spool on which the tape is wound is important in order to be able to perform the testing function. Those skilled in the art will also understand that there are many other changes that may be made as well. Such modifications are intended to be included within the spirit of the present invention, as limited only by the scope of the following claims.

What is claimed is:

1. A tape cassette for testing tape tensioning devices of tape recorders and players comprising:
    a housing;
    takeup reel means rotationally mounted in said housing for winding up tape in the direction of recording and playback;
    supply reel means rotationally mounted in said housing for supplying tape in the direction of recording and playback; and
    a tape connected to said supply reel means and to said takeup reel means;
    at least one of said supply reel means and said takeup reel means further comprising:
        a first portion having a radius equal to the radius of a substantially full reel of tape; and
        a second portion having a radius equal to the radius of a substantially empty reel of tape;
        said at least one of said supply reel means and said takeup reel means supplying tape or taking up tape in the direction of recording and playback at each of said first portion radius and of said second portion radius during each revolution of said at least one of said supply reel means and said takeup reel means.

2. A tape cassette as in claim 1 wherein said first portion and said second portion are of equal length.

3. A tape cassette as in claim 1 wherein said first portion and said second portion are connected by substantially straight portions.

4. A tape cassette as in claim 1 wherein said first portion and said second portion are connected by arcuate portions.

5. A method of testing tape tensioning devices of tape recorders and players comprising the steps of:
    placing a test cassette in said tape recorder or player, said test cassette having a reel with a first circular arc portion having a radius simulating the radius of a substantially full reel of tape, and a second circular arc portion having a radius simulating the radius of a substantially empty reel of tape;
    starting said tape recorder and player; and
    measuring the tape tension as said tape recorder and player operates.

6. A tape cassette for testing tape tensioning devices of tape recorders and players comprising:
    a housing;
    takeup reel means rotationally mounted in said housing for winding up tape in the direction of recording and playback;
    supply reel means rotationally mounted in said housing for supplying tape in the direction of recording and playback; and
    a tape connected to said supply reel means and to said takeup reel means;
    at least one of said supply reel means and said takeup reel means further comprising:
        a first portion having a first radius; and
        a second portion having a second radius not equal to said first radius;
        said at least one of said supply reel means and said takeup reel means supplying or taking up tape in the direction of recording and playback at each of said first radius and of said second radius during each revolution of said at least one of said supply reel means and said takeup reel means.

7. A spool for holding recording tape comprising:

a first portion having a first radius forming part of a first circumference, the center of which defines the center of rotation of the spool;

a second portion having a second radius different from said first radius forming part of a second circumference, said second radius concentric with said first radius;

said first portion and said second portion attached to each other in a manner to permit recording tape to be wound on said spool over said first and second portions sequentially on each revolution of the spool so that said tape is wound about said center at said first radius on said first circumference and said tape is wound at said second radius on said second circumference.

* * * * *